US012613693B2

(12) United States Patent
Hernández et al.

(10) Patent No.: US 12,613,693 B2
(45) Date of Patent: Apr. 28, 2026

(54) ON-THE-FLY LINKER TARGETING

(71) Applicant: RED BALLOON SECURITY, INC.,
New York, NY (US)

(72) Inventors: Andrés Hernández, New York, NY
(US); Joel Clarence Cretan, New
York, NY (US); Anastasis Keliris, New
York, NY (US); Wyatt Gerard Ford,
New York, NY (US); Ang Cui, New
York, NY (US)

(73) Assignee: RED BALLOON SECURITY, INC.,
New York, NY (US)

( * ) Notice: Subject to any disclaimer, the term of this
patent is extended or adjusted under 35
U.S.C. 154(b) by 168 days.

(21) Appl. No.: 18/211,801

(22) Filed: Jun. 20, 2023

(65) Prior Publication Data

US 2023/0409313 A1 Dec. 21, 2023

Related U.S. Application Data

(60) Provisional application No. 63/353,702, filed on Jun.
20, 2022.

(51) Int. Cl.
G06F 8/658 (2018.01)

(52) U.S. Cl.
CPC .................................... G06F 8/658 (2018.02)

(58) Field of Classification Search
CPC ....................................................... G06F 8/658
See application file for complete search history.

(56) References Cited

U.S. PATENT DOCUMENTS

| | | | | |
|---|---|---|---|---|
| 5,999,737 A | * | 12/1999 | Srivastava .............. | G06F 8/445 |
| | | | | 717/146 |
| 7,543,309 B2 | * | 6/2009 | Forin .................... | G06F 9/4411 |
| | | | | 719/331 |
| 7,810,080 B2 | * | 10/2010 | Plum ................... | G06F 11/3624 |
| | | | | 717/114 |

(Continued)

FOREIGN PATENT DOCUMENTS

WO    WO-2019241921 A1 * 12/2019 .......... G06F 11/3065

OTHER PUBLICATIONS

Jeong, Haegeon, Jeanseong Baik, and Kyungtae Kang. "Functional
level hot-patching platform for executable and linkable format
binaries." 2017 IEEE International Conference on Systems, Man,
and Cybernetics (SMC). IEEE, 2017.*

(Continued)

*Primary Examiner* — Francisco J Aponte
(74) *Attorney, Agent, or Firm* — Sheppard, Mullin,
Richter & Hampton LLP

(57) ABSTRACT

Systems and methods are provided for programmatically
generating programs that control software linkers to place
new executable binary code and/or data patches in existing,
executable binaries, which may be fully-linked. Examples
disclosed herein include obtaining a first executable; obtain-
ing target information that identifies unused space in the first
executable; obtaining one or more routines; generating a
linker control program based on the target information and
the one or more routines; linking, by the linker control
program, the one or more routines into one or more second
executables; and patching the first executable with the one or
more second executables.

20 Claims, 5 Drawing Sheets

(56) References Cited

U.S. PATENT DOCUMENTS

| | | | | |
|---|---|---|---|---|
| 8,468,516 B1* | 6/2013 | Chen | .................. | G06F 8/656 |
| | | | | 717/169 |
| 8,726,257 B2* | 5/2014 | Kilbane | .................. | G06F 8/54 |
| | | | | 717/162 |
| 8,832,672 B2* | 9/2014 | Schmidt | .................. | G06F 8/443 |
| | | | | 717/151 |
| 9,213,532 B2* | 12/2015 | Guthridge | .................. | G06F 8/4441 |
| 9,495,136 B2* | 11/2016 | Schmidt | .................. | G06F 8/443 |
| 9,696,966 B2* | 7/2017 | Edwards | .................. | G06F 8/4441 |
| 10,466,986 B2* | 11/2019 | Kocberber | .................. | G06F 8/48 |
| 10,795,659 B1* | 10/2020 | Kinsburskiy | .................. | G06F 8/65 |
| 11,481,200 B1* | 10/2022 | Huang | .................. | G06F 8/76 |
| 11,507,362 B1* | 11/2022 | Kinsburskiy | .................. | G06F 8/656 |
| 2006/0259903 A1* | 11/2006 | Vernon | .................. | G06F 21/16 |
| | | | | 717/174 |
| 2010/0077387 A1* | 3/2010 | Callaghan | .................. | G06F 8/658 |
| | | | | 717/140 |
| 2011/0010696 A1* | 1/2011 | Lobo | .................. | G06F 8/4435 |
| | | | | 717/165 |
| 2015/0317139 A1* | 11/2015 | Tallam | .................. | G06F 8/447 |
| | | | | 717/151 |
| 2016/0321046 A1* | 11/2016 | Pizlo | .................. | G06F 8/443 |
| 2017/0139694 A1* | 5/2017 | Larin | .................. | G06F 9/44521 |
| 2017/0139696 A1* | 5/2017 | Yehuda | .................. | G06F 8/61 |
| 2017/0344349 A1* | 11/2017 | He | .................. | G06F 8/443 |
| 2019/0087164 A1* | 3/2019 | Kong | .................. | G06F 8/433 |
| 2020/0097392 A1* | 3/2020 | Pizlo | .................. | G06F 12/0284 |
| 2020/0293295 A1* | 9/2020 | Gao | .................. | G06F 11/3457 |
| 2021/0157559 A1* | 5/2021 | Tye | .................. | G06F 9/44521 |
| 2022/0137841 A1* | 5/2022 | Gisbert | .................. | G06F 3/0631 |
| | | | | 711/154 |

OTHER PUBLICATIONS

Theodoridis, Theodoros, Manuel Rigger, and Zhendong Su. "Finding missed optimizations through the lens of dead code elimination." Proceedings of the 27th ACM International Conference on Architectural Support for Programming Languages and Operating Systems. 2022.*

* cited by examiner

100 original source code 102 compile 104 link 106 executable program binary 108

400

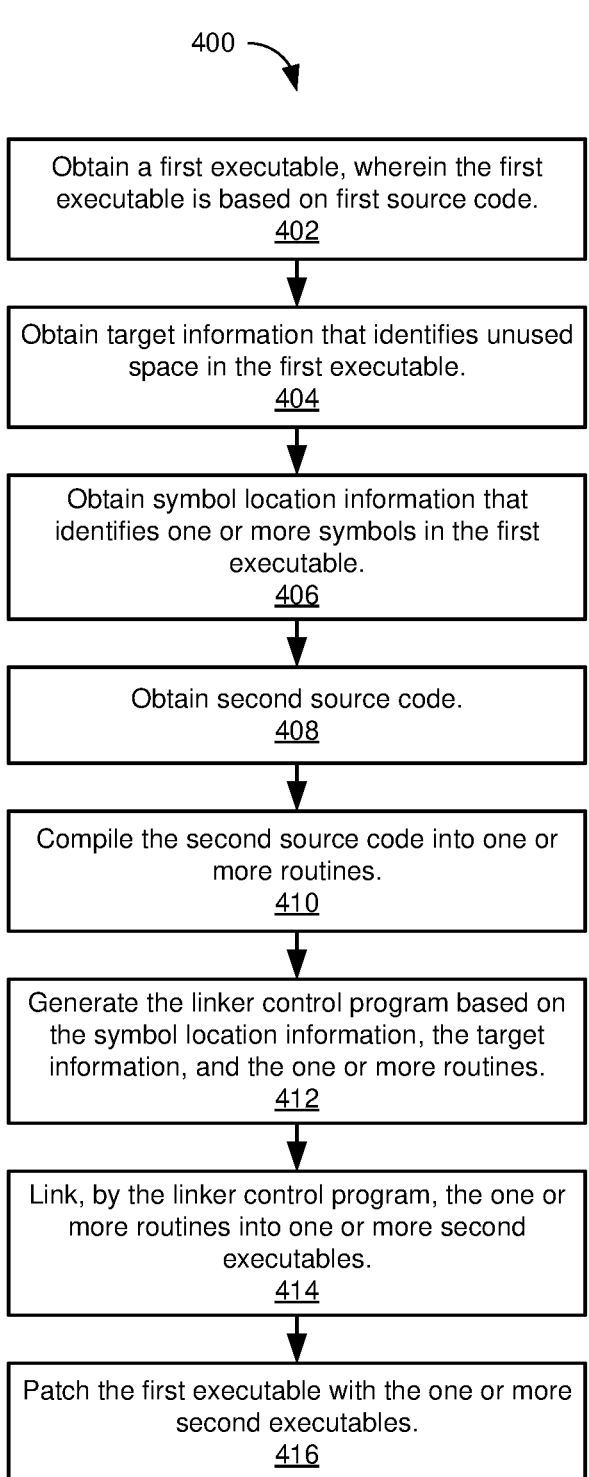

Obtain a first executable, wherein the first executable is based on first source code.
402

Obtain target information that identifies unused space in the first executable.
404

Obtain symbol location information that identifies one or more symbols in the first executable.
406

Obtain second source code.
408

Compile the second source code into one or more routines.
410

Generate the linker control program based on the symbol location information, the target information, and the one or more routines.
412

Link, by the linker control program, the one or more routines into one or more second executables.
414

Patch the first executable with the one or more second executables.
416

FIG. 4

ON-THE-FLY LINKER TARGETING

REFERENCE TO RELATED APPLICATION

The present application the benefit of and priority to U.S. Provisional Patent Application Ser. No. 63/353,702, filed on Jun. 20, 2022 and titled "ON-THE-FLY LINKER TARGETING," the contents of which is incorporated herein by reference in its entirety.

STATEMENT REGARDING FEDERALLY SPONSORED R&D

This invention was made with government support under Contract No. N66001-20-C-4032 issued by the Naval Information Warfare Center Pacific (NIWC Pacific), and supported by the Defense Advanced Research Projects Agency (DARPA). The government may have certain rights in the invention.

BACKGROUND

The disclosed technology relates generally to computer software executables, and more particularly some embodiments relate to patching computer software executables.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 is a flowchart illustrating an example injection process according to embodiments of the technologies disclosed herein.

The figures are not exhaustive and do not limit the present disclosure to the precise form disclosed.

DETAILED DESCRIPTION

Embodiments of the disclosed technologies provide novel methods and apparatus to programmatically generate programs that control software linkers to place new executable binary code and/or data patches in existing, executable binaries, which may be fully-linked.

Figure 1:
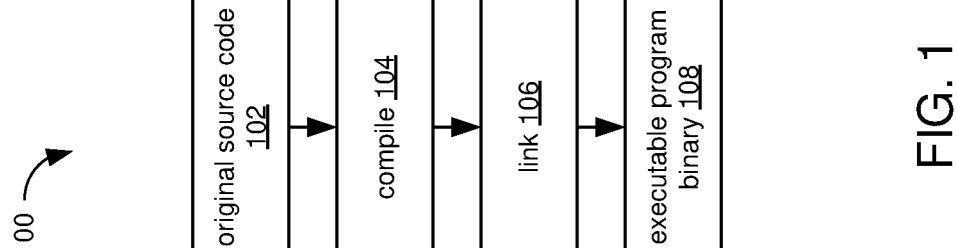
FIG. 1 is a flowchart illustrating an example process for program.

The modern program compilation process is comprised of three main steps: compilation, assembly, and linking. FIG. 1 illustrates this process 100. Referring to FIG. 1, the process 100 begins with original source code 102. Compilation is properly defined as the process of generating assembly instructions based on the source code 102. Assembly is the process of generating machine code based on the assembly instructions. The first two steps are often informally referred to together as "compilation", at 104.

Linking 106 is the process of linking independent binary translation units into a final "executable program" 108, also referred to as an "executable" or a "binary". These three steps are performed by tools called a compiler, and assembler, and a linker, respectively. Together, these tools are often referred to as a "toolchain." There are numerous examples of tools and toolchains which allow fine control over the compilation process.

Toolchains can expose this fine control over the compilation process by interpreting a specific programming language that enables the developer to declare various parameters pertaining to a particular step. For example, a linker control language may be employed to generate a linker control program that controls the linker.

Embodiments of the disclosed technologies provide novel methods and apparatus to apply transformations to executables that have already been created via the compilation process described above. The executables may be fully linked when these transformations are applied. These transformations may include the addition ("injection") of new routines. Here, "new routines" means any combinations of routines not already present in the original binary and/or new or modified versions of routines already present.

Figure 2:
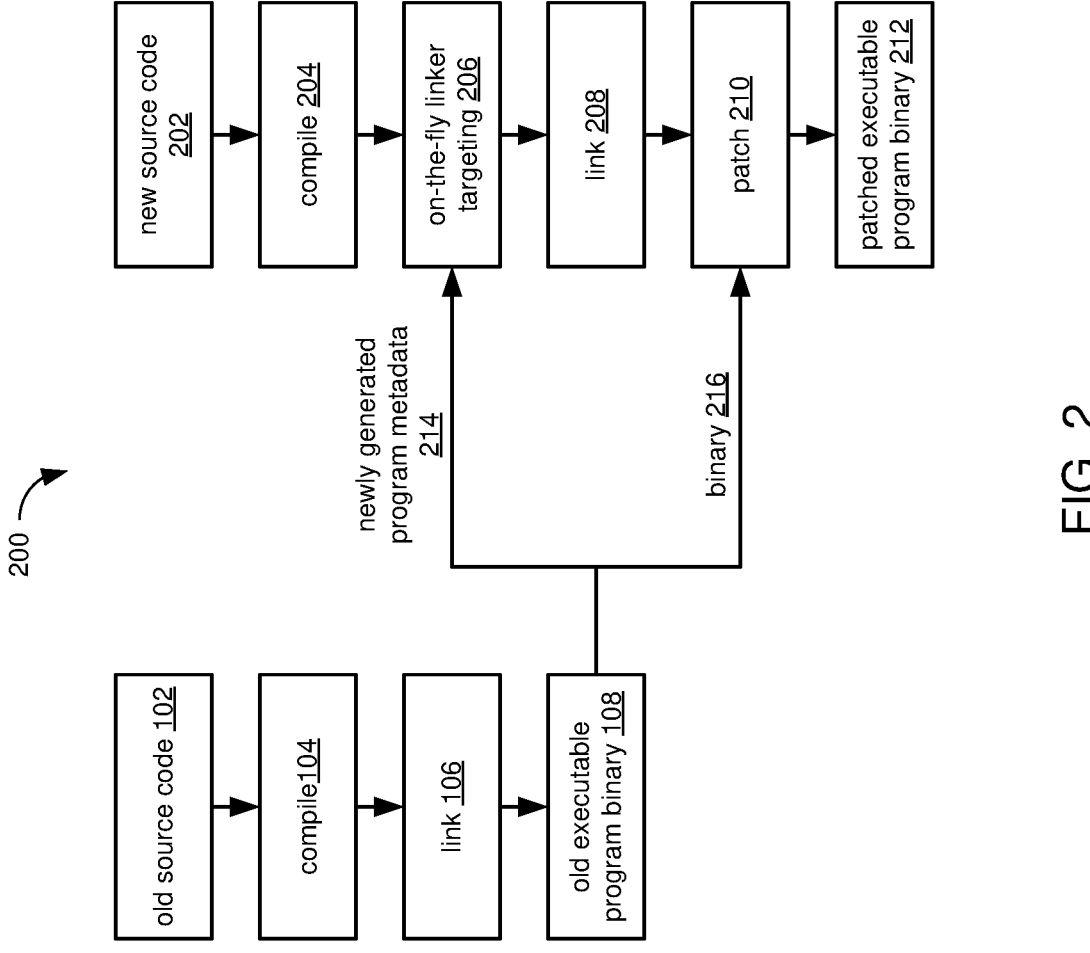
FIG. 2 illustrates an example injection process in accordance with embodiments of the technologies disclosed herein.

FIG. 2 illustrates an injection process 200 according to some embodiments of the disclosed technologies. Referring to FIG. 2, the modern program compilation process 100 of FIG. 1 is shown at 102-108. The new source code to be injected may be provided, at 202. The new source code may be compiled into new routines, at 204. Compiling at 204 may be performed in a manner similar to compilation at 104 of FIG. 1.

On-the-fly linker targeting may be performed on the new routines, at 206. This process at 206 may also receive newly generated program metadata, at 214. On-the-fly linker targeting may include generation of a new linker control program. The generation of a new linker control program may be based on an automated analysis of the old executable program binary 108 and the new routines. The automated analysis may include analysis of the original executable, which may be fully linked, including analysis for existing free space, unused space, and symbols. The automated analysis may include analysis of metadata and debug info in the old executable program binary 108. In some embodiments, a reusable software library can be leveraged to perform the automated analysis. Additionally, in some implementations, the automated analysis may be automatically triggered based a new executable program binary as the old executable program binary 108. The analysis may generate destination information, size information, and code/data for each of the new routines. The determined destination information for a new routine may indicate a location in the old executable program binary 108 where the routine is to be patched in. The size information for a routine may indicate the size of the new routine.

The new routines may be linked into a new executable format using the newly-generated custom linker control program and the toolchain linker (e.g., the on-the-fly linker targeting), at 208. The binary 216 from the old executable program binary 108 may be patched with the new routines, which may be linked routines, using the destination, size information, and code/data provided by the automated analysis of the routines, at 210. In various examples, the binary 216 is the same binary as the old executable program binary 108.

The result of process 200 is a patched executable program binary 212.

Figure 3:
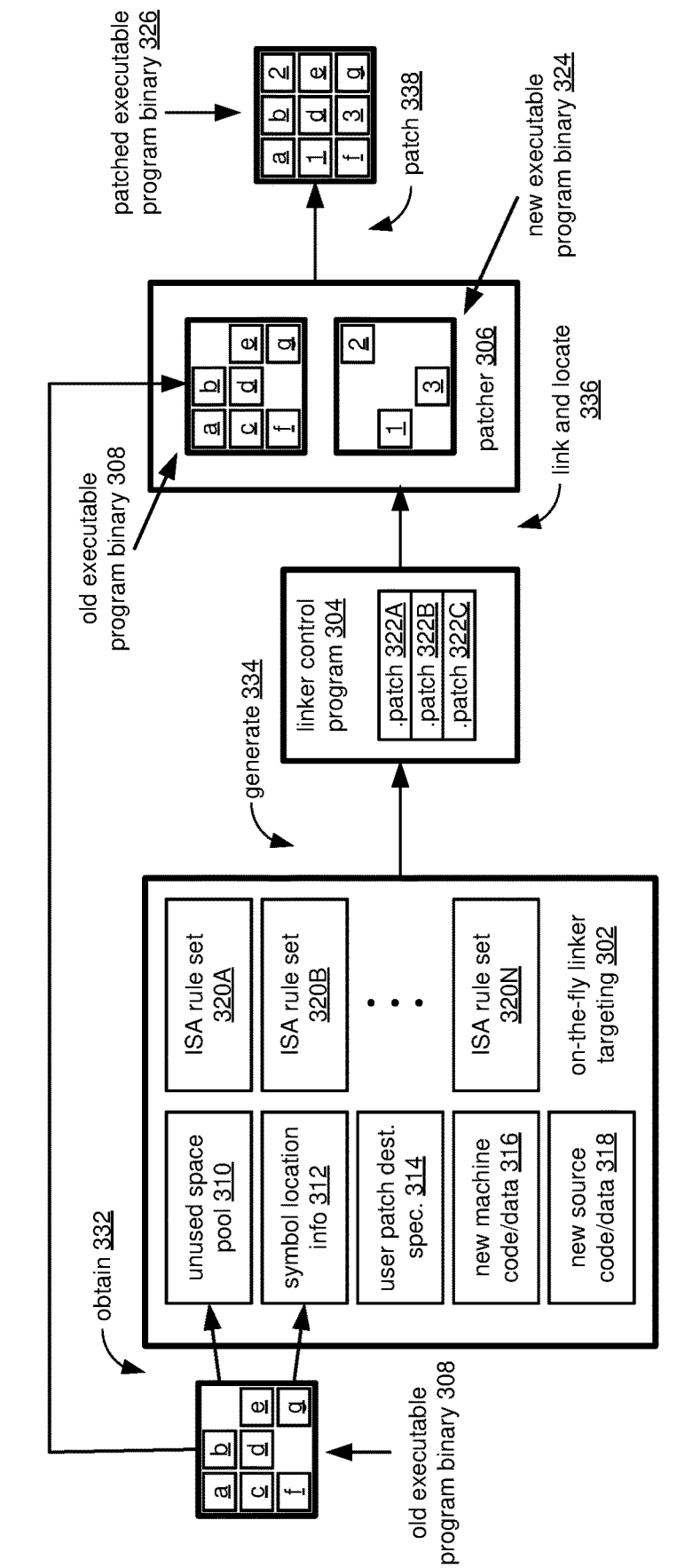
FIG. 3 is a schematic diagram of an example injection process in accordance with embodiments of the technologies disclosed herein.

FIG. 3 illustrates a computer implemented injection process 300 according to some embodiments of the disclosed technologies. Referring to FIG. 3, the process 300 begins with an old executable program binary 308 to be patched with new routines, and new machine code/data 316 and/or new source code/data 318 to be patched into the old executable program binary 308. In the example of FIG. 3, the old executable program binary 308 has nine blocks. Seven of the blocks are used, that is, occupied with code/data: blocks a, b, c, d, e, f, and g. The other two blocks are free space.

On-the-fly linker (OTF) linker targeting module 302 may obtain an unused space pool 310 and symbol location information 312 for the old executable program binary 308, at 332. The unused space pool 310 may identify unused space in the old executable program binary 308. As used herein, the term "unused space" may refer to space that is free, and to space that is not free but is occupied by code/data that is unused. The unused space pool 310 and symbol location information 312 may be obtained by manual or automated analysis of the old executable program binary 308.

The OTF linker targeting module 302 may obtain a user patch destination specification 314. The user patch destination specification 314 may identify locations in the old executable program binary 108 where the new routines are to be patched in. The user patch destination specification 314 may be obtained by manual or automated analysis of the old executable program binary 308.

The OTF linker targeting module 302 may support one or more instruction set architecture (ISA) rule sets. Each ISA represents a potentially different methodology for generating the specific programming language for the toolchain linker control program. By supporting multiple ISAs, the OTF linker targeting module 302 may support multiple different linker control programs. In the example of FIG. 3, the new linker control program 304 supports ISAs 320A, B-N.

The OTF linker targeting module 302 may automatically generate a new linker control program 304, at 334. The new linker control program 304 may include one or more routines (e.g., patches) 322. For example, the on-the-fly targeting 302 identifies that the there is sufficient unused space in the old executable program binary 308 from the unused space pool 310 and generates the linker control program 304 containing contain instructions in the form of routines and/or syntax for placing patches 322 for the new machine code/data 316 into blocks corresponding to locations of the unused space of old executable program binary 308. In the example of FIG. 3, the new linker control program 304 includes three patches 322A,B,C. Each patch 322 is linked and located according to its determined destination information, at 336, to produce a new executable program binary 324. In the example of FIG. 3, the new executable program binary 324 includes three blocks (blocks 1, 2, and 3), each representing one of the patches 322, and each located according to its destination information. In the example of FIG. 3, new blocks 2 and 3 are located in free space. Old block c has been identified as unused space; new block 1 is located in that space, and will overwrite old block c.

In an illustrative example, the new machine code/data 316 can be compiled from the new source code/data 318 to generate the linker control program 304. This can result in a routine requiring a number of bytes of memory space, such as 1,024 bytes in this example. The on-the-fly linker targeting 302 determines locations of the same or larger amounts of contiguous, unused space exists. The on-the-fly linker targeting 302 targeting process populates the linker control program 304 with syntax that specifies one of the determined locations (i.e. address). The linker control program 304 can then be populated with syntax that specifies that the patches 322 for the new machine code/data 316 shall be linked to that location.

A patcher module 306 receives the old executable program binary 308 and the new executable program binary 324, and patches the old executable program binary 308 with the new executable program binary 324, at 338. The result is a patched executable program binary 326.

FIG. 4 is a flowchart illustrating an injection process 400 according to some embodiments of the disclosed technologies. The elements of the process 400 are presented in one arrangement. However, it should be understood that one or more elements of the process may be performed in a different order, in parallel, omitted entirely, and the like. Furthermore, the process 400 may include other elements in addition to those presented. For example, the process 400 may include error-handling functions if exceptions occur, and the like.

Referring again to FIG. 4, the process 400 may include obtaining a first executable, wherein the first executable is based on first source code, at 402. For example, the first executable may be the old executable program binary 108 of FIG. 2 or the old executable program binary 308 of FIG. 3. In some embodiments, the first executable may be obtained by obtaining the first source code and compiling the first source code.

Referring again to FIG. 4, the process 400 may include obtaining target information that identifies unused space in the first executable, at 404. For example, the target information may include the unused space pool 310 of FIG. 3. In some examples, unused space may be created by removing used, non-critical code/data from the first executable. In some cases, there may not be enough unused space in the first executable or it may not be feasible to remove code/data from the first executable to create additional unused space. Said another way, the size of the unused space in the first executable may not be sufficient to accommodate second executables, described below in connection with 414. Sufficient to accommodate may refer to the size of the unused space being equal to or larger than the collective size of the second executables. In such cases, free space may be created by expanding the size of the first executable. For example, the first executable may be expanded, statically. That is, as an illustrative example, a 2 megabyte file can be expanded to become a 2.5 megabyte file because a section of the executable held in the file can be enlarged to accommodate the new routines.

Referring again to FIG. 4, the process 400 may include obtaining symbol location information that identifies one or more symbols in the first executable, at 406. For example, the symbol location information may include the symbol location information 312 of FIG. 3.

Referring again to FIG. 4, the process 400 may include obtaining second source code, at 408. For example, the second source code may be the new source code 202 of FIG. 2 or the new source code/data 318 of FIG. 3.

Referring again to FIG. 4, the process 400 may include obtaining one or more routines. For example, process 400 may include compiling the second source code into one or more routines to obtain the one or more routines, at 410. In the example of FIG. 2, the routines may be obtained by obtaining the new source code 202 and compiling the second source code 202, at 204. In the example of FIG. 3, the routines may be obtained by compiling the new source code/data 318 to produce the new machine code/data 316.

Referring again to FIG. 4, the process 400 may include generating a linker control program based on the symbol location information, the target information, and the one or more routines, at 412. In the example of FIG. 2, the linker control program may be generated by on-the-fly linker targeting 206. In the example of FIG. 3, the linker control program 304 may be generated by on-the-fly linker targeting module 302.

Referring again to FIG. 4, the process 400 may include linking, by the linker control program, the one or more routines into one or more second executables, at 414. In the example of FIG. 3, the linker control program 304 may link the patches 322 into the new executable program binary 324, at 336.

Referring again to FIG. 4, the process 400 may include patching the first executable with the one or more second executables, at 416. In the example of FIG. 3, the patcher module 306 may combine the old executable program binary 308 with the new executable program binary 324 to produce the patched executable program binary 326, at 338. The patched executable program binary 326 contains blocks a, b, c, d, e, f, g, 1, 2, and 3, as shown in FIG. 3.

Patching the first executable may include adding the one or more second executables to the first executable according to determined size and destination information for the one or more second executables. For example, sizes and the locations of unused space in the first executable can be determined. Then, for each determined location, a routine of the one or more routines can be identified having a size that is less than or equal to the determined location. The identified routine can then be added to the determined location. Embodiments disclosed herein can determine sizes for each location of unused space and then distribute routines into the determined locations based on determined sizes of locations and size of the routines such that no routine is larger than the location to which it is added. Thus, given size and location information of the unused space, for each patch, an appropriate instance of unused space can be selected such that the patch does not "overrun" into used code/data.

Embodiments of the disclosed technologies provide numerous advantages over prior approaches. Embodiments may reduce the number of lines of code by two orders of magnitude. Embodiments may reduce debug time by an order of magnitude. Some embodiments are capable of modifying multiple programs with the same new code at the same time.

Figure 5:
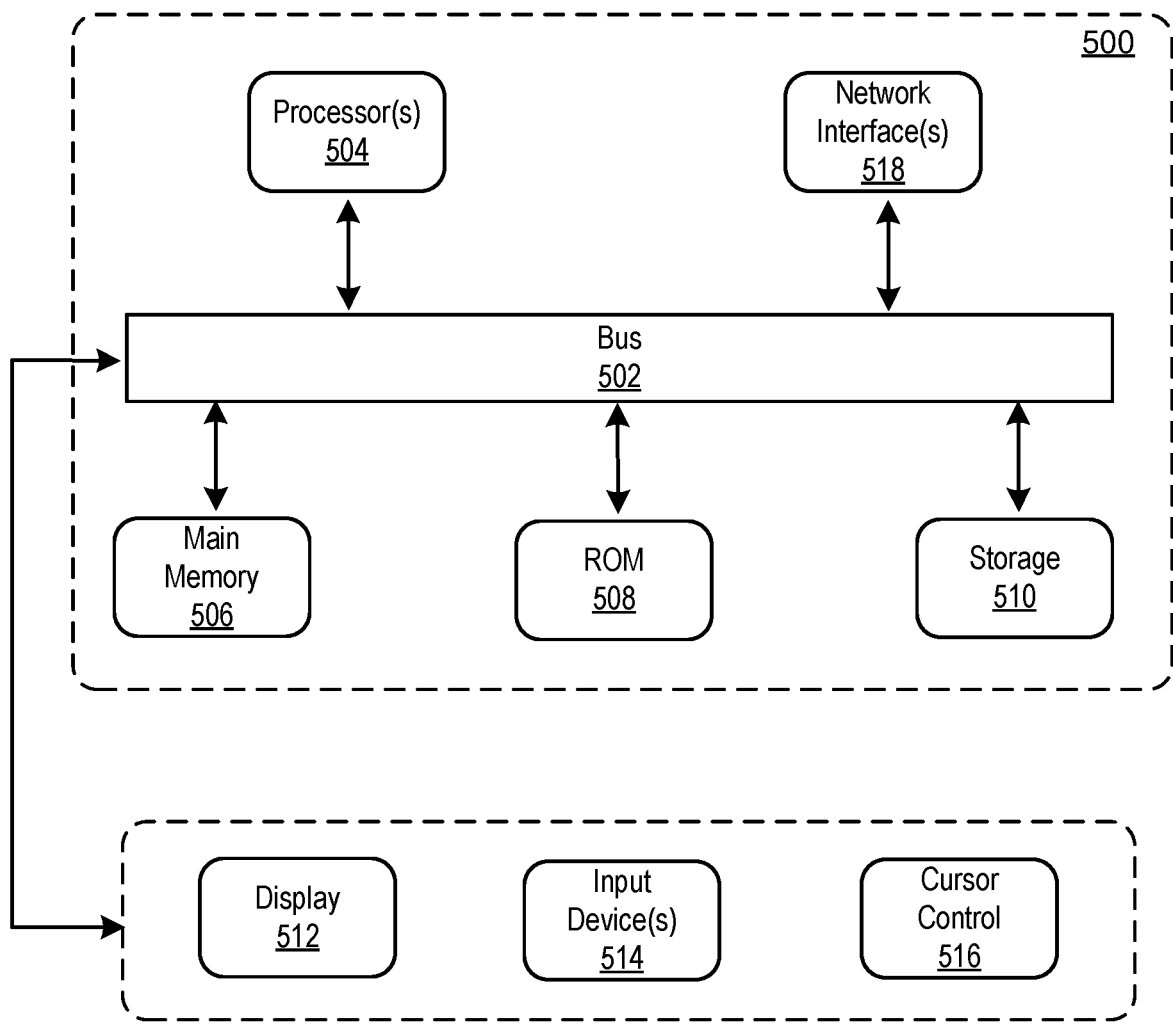
FIG. 5 is an example computing system in which embodiments described in the present disclosure may be implemented.

FIG. 5 depicts a block diagram of an example computer system 500 in which embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. Static information and instructions may be A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules provided in the present disclosure may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The phrase "non-transitory media," "non-transitory computer-readable medium," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and net-worked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or a WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
obtaining a first executable;
obtaining first target information that identifies unused space in the first executable;
obtaining one or more first routines;
generating a first linker control program based on the first target information and the one or more first routines;
patching, by a linker controlled by the first linker control program, the first executable, wherein patching the first executable comprises linking the one or more first routines into one or more second executables in the first executable;
obtaining a third executable;
obtaining second target information that identifies unused space in the third executable;
obtaining one or more second routines;
generating a second linker control program based on the second target information and the one or more second routines; and
patching, by the linker controlled by the second linker control program, the third executable, wherein patching the third executable comprises linking the one or more second routines into one or more fourth executables in the third executable.

2. The method of claim 1, further comprising:
obtaining symbol location information that identifies one or more symbols in the first executable; and
generating the first linker control program based on the symbol location information, the first target information, and the one or more first routines.

3. The method of claim 1, wherein linking the one or more first routines comprises:
determining size and destination information for the one or more second executables.

4. The method of claim 3, wherein patching the first executable comprises:
adding the one or more second executables to the first executable according to the determined size and destination information for the one or more second executables.

5. The method of claim 1, further comprising:
obtaining a first source code;
obtaining a second source code; and
compiling the second source code into the one or more first routines,
wherein the first executable is based on first source code.

6. The method of claim 5, wherein obtaining the first executable comprises:
compiling the first source code.

7. The method of claim 5, wherein obtaining the one or more second executables comprises:
compiling the second source code.

8. The method of claim 1, wherein the identified unused space in the first executable comprises at least one of:
free space comprising no code or data; and
unused space comprising at least one of unused code and unused data.

9. The method of claim 1, further comprising:
determining whether the identified unused space in the first executable is sufficient to accommodate the one or more second executables; and
responsive to determining the identified unused space in the first executable is not sufficient to accommodate the one or more second executables, creating new space in the first executable.

10. A system comprising:
memory configured to store instructions; and
one or more processors coupled to the memory and configured to execute the instructions to cause the system to perform operations comprising:
obtaining a first executable;
obtaining first target information that identifies unused space in the first executable;
obtaining one or more first routines;
generating a first linker control program based on the first target information and the one or more first routines;
patching, by a linker controlled by the first linker control program, the first executable, wherein patching the first executable comprises linking the one or more first routines into one or more second executables in the first executable;
obtaining a third executable;
obtaining second target information that identifies unused space in the third executable;
obtaining one or more second routines;
generating a second linker control program based on the second target information and the one or more second routines; and
patching, by the linker controlled by the second linker control program, the third executable, wherein patching the third executable comprises linking the one or more second routines into one or more fourth executables in the third executable.

11. The system of claim 10, wherein the operations further comprise:

obtaining symbol location information that identifies one or more symbols in the first executable; and generating the first linker control program based on the symbol location information, the first target information, and the one or more first routines.

12. The system of claim 10, wherein linking the one or more first routines comprises:

determining size and destination information for the one or more second executables.

13. The system of claim 12, wherein patching the first executable comprises:

adding the one or more second executables to the first executable according to the determined size and destination information for the one or more second executables.

14. The system of claim 10, wherein the first executable is based on a first source code, and wherein obtaining the first executable comprises:

obtaining the first source code; and compiling the first source code.

15. The system of claim 10, wherein the identified unused space in the first executable comprises at least one of:

free space comprising no code or data; and unused space comprising at least one of unused code and unused data.

16. The system of claim 10, the operations further comprise:

obtaining second source code; and compiling the second source code into the one or more first routines, wherein obtaining the one or more second executables comprises compiling the second source code.

17. The system of claim 10, wherein patching the first executable with the one or more second executables comprises:

determining whether the identified unused space in the first executable is sufficient to accommodate the one or more second executables; and responsive to determining the identified unused space in the first executable is not sufficient to accommodate the one or more second executables, creating new space in the first executable.

18. A non-transitory computer-readable storage medium configured with instructions executable by one or more processors to cause the one or more processors to perform operations comprising:

generating a first linker control program based on first target information and one or more first routines, wherein the first target information identifies unused space in a first executable;

patching, using a linker controlled by the first linker control program, the first executable, wherein patching the first executable comprises linking the one or more first routines into one or more second executables in the first executable;

generating a second linker control program based on second target information and one or more second routines, wherein the second target information identifies unused space in a third executable; and patching, using the linker controlled by the second linker control program, the third executable, wherein patching the third executable comprises linking the one or more second routines into one or more fourth executables in the third executable.

19. The non-transitory computer-readable storage medium of claim 18, wherein linking the one or more first routines comprises:

determining size and destination information for the one or more second executables.

20. The non-transitory computer-readable storage medium of claim 19, wherein patching the first executable comprises:

adding the one or more second executables to the first executable according to the determined size and destination information for the one or more second executables.

* * * * *